United States Patent
Wong et al.

(10) Patent No.: US 11,443,393 B2
(45) Date of Patent: Sep. 13, 2022

(54) BLOCKCHAIN-BASED REFERRAL TRACKING SYSTEM (BRTS)

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/121,554

(22) Filed: Dec. 14, 2020

(65) Prior Publication Data
US 2022/0188944 A1    Jun. 16, 2022

(51) Int. Cl.
*G06Q 30/00* (2012.01)
*G06Q 50/00* (2012.01)
(Continued)

(52) U.S. Cl.
CPC ......... *G06Q 50/01* (2013.01); *G06F 16/2379* (2019.01); *G06N 3/04* (2013.01);
(Continued)

(58) Field of Classification Search
CPC .............. G06Q 50/01; G06Q 30/0214; G06Q 30/0215; G06F 16/2379; G06N 3/04; G06N 3/08; H04L 67/141
See application file for complete search history.

(56) References Cited

U.S. PATENT DOCUMENTS

2009/0119710 A1* 5/2009 Lo ................. H04L 12/1859
   725/39
2009/0196570 A1* 8/2009 Dudas ............... G11B 27/034
   709/206

(Continued)

FOREIGN PATENT DOCUMENTS

CN    110233833 A  *  9/2019  ......... G06F 21/6263

OTHER PUBLICATIONS

Chauhan; A_Blockchain-Based_Tracking_System; SOSE/IEEE 2020; pp. 111-115; 2020.*

(Continued)

*Primary Examiner* — Radu Andrei
(74) *Attorney, Agent, or Firm* — Helen Mao; Imperium Patent Works

(57) ABSTRACT

Methods and systems are provided for blockchain-based social media commerce referral tracking system (BRTS). In one novel aspect, the blockchain is used to support traceability and transparency for the referral tracking system that monitors transactions of one or more user generated contents (UGCs) with one or more actionable items. Traceability and transparency foster trust among participants. In one embodiment, the BRTS tracks transactions of a UGC, updates a UGC record upon detecting one or more predefined transactions at a receiving node, detects one or more exit transactions at an ending node, and adds a UGC tuple of transactions from the originator node to the ending node based on the UGC record to a blockchain database upon detecting the one or more exit conditions. In another embodiment, the UGC record is updated using a recursive push procedure. In one embodiment, the BRTS generates one or more referral rewards for each UGC tuple record based on a configured rewarding scheme.

20 Claims, 5 Drawing Sheets

(51) Int. Cl.
*G06Q 30/02* (2012.01)
*H04L 67/141* (2022.01)
*G06N 3/04* (2006.01)
*G06N 3/08* (2006.01)
*G06F 16/23* (2019.01)

(52) U.S. Cl.
CPC ........... *G06N 3/08* (2013.01); *G06Q 30/0214* (2013.01); *G06Q 30/0215* (2013.01); *H04L 67/141* (2013.01)

(56) References Cited

U.S. PATENT DOCUMENTS

| | | | |
|---|---|---|---|
| 2016/0180386 A1* | 6/2016 | Konig | G06Q 30/0255 705/14.55 |
| 2016/0314501 A1* | 10/2016 | Bartholomew | G06Q 30/0275 |
| 2017/0364936 A1* | 12/2017 | Balfour | G06Q 20/204 |
| 2019/0026782 A1* | 1/2019 | McGrath | G06F 16/9535 |
| 2020/0111186 A1* | 4/2020 | Barkeloo | G06F 16/2379 |
| 2020/0297458 A1* | 9/2020 | Roschin | G16H 50/20 |

OTHER PUBLICATIONS

Cui; A_Blockchain-Based_Framework_for_Supply_Chain_Provenance; IEEE Access' [ages 157113-157125; 2019.*
Sheng; Near-Online_Tracking_With_Co-Occurrence_Constraints_in_Blockchain-Based_Edge_Computing; IEEE 2021; pp. 2193-2207, 2019.*

* cited by examiner

BLOCKCHAIN-BASED REFERRAL TRACKING SYSTEM (BRTS)

TECHNICAL FIELD

The present invention relates generally to referral system and, more particularly, a blockchain-based social media commerce referral system.

BACKGROUND

The explosive growth of social network provides people with a wide range of benefits. The members of the social network share a wide variety of information through the social media platform. People rely on the social network, also known as the social media network, to get more connected and get information faster. In recent years, the social media network has extended beyond casual networking among friends and families. The social media platform has increasingly gained applications for business and professional uses. In the marketing area, the traditional word-of-mouth (WOM) phenomenon has evolved into a new form of communication, namely, eWOM (electronic WOM). eWOM includes blogs, online reviews, social media posts, and messages posted on online groups. Opinion leader before social media on the Internet was difficult to come by. It was costly to grow and promote an OL because it had to go through the conventional media channels and/or word-of-mouth. In the Internet social media age, OL becomes a very viable and scalable concept. They can reach out to millions of listeners relatively easier. There are "celebrities" in social media. Some of them are celebrities in their own rights, such as artists, movie stars, athletes, etc. They are natural opinion leaders. Others find their ways to offer entertaining contents with writing, audio, and video, or to offer practical hands-on experiences, or to offer expert knowledge. They have followers very much like the traditional opinion leaders. Key opinion leader (KOL), also known as influencer, is what we call these opinion leaders in social media. Digital marketing can be monetized in two major forms: (1) conventional online advertising, and (2) eWOM in social media commerce. In conventional online advertising, the advertiser creates product or service hyperlinks, banner ads etc., and places them onto their affiliated partner's websites or social media pages. Showing the ads and/or clicking the hyperlinks will trigger events such as collecting the consumer's information, frequency of the clicks, the number of views, etc. Advertisers collect this information to justify their advertising effectiveness and to charge their clients accordingly. Affiliates, either companies who carry the hyperlinks on their web pages or individuals such as bloggers embedding the links in their blogs, will receive monetary rewards for their participation. However, the current online advertising lacks effectiveness. A study shows that 75% of people do not believe advertisements, while 92% believe recommendations from friends, and KOLs who they are following. With the expected further growth in social media commerce, eWOM through online referral sees great growth opportunities.

Improvements and enhancements are required to use a more efficient way to provide social media referral marketing.

SUMMARY

Methods and systems are provided for blockchain-based referral tracking system (BRTS). In one novel aspect, a blockchain is used to support traceability and transparency for the referral tracking system that tracking transactions of one or more user generated contents (UGCs) with one or more actionable items. Traceability and transparency foster trust among participants. In one embodiment, the BRTS tracks transactions of a user generated content (UGC), wherein the UGC propagates from an originator node through multiple receiving nodes in a social media network, and wherein the UGC comprises one or more actionable items, updates a UGC record upon detecting one or more predefined transactions at a receiving node, wherein the UGC record comprising at least a transaction history from the originator node to the receiving node, detects one or more exit transactions at an ending node, and adds a UGC tuple of transactions from the originator node to the ending node based on the UGC record to a blockchain database upon detecting the one or more exit conditions. In one embodiment, the one or more predefined transactions comprise pushing the UGC to one or more receiving nodes, acting on the one or more actionable items, and an expiration of a no-action timer. In another embodiment, the one or more exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node. In one embodiment, each transaction in the UGC record is associated with a timestamp indicating a time of the transaction. In another embodiment, the UGC record is updated using a recursive push procedure with inputs of a pushing node, a recipient node, and a payload. In one embodiment, the BRTS generates one or more referral rewards for each UGC tuple record based on a configured rewarding scheme. In another embodiment, the configured reward scheme is generated and updated through a user interface by user inputs. In one embodiment, the BRTS retrieves one or more UGC tuple records from the blockchain database upon detecting one or more user requests. In another embodiment, the UGC is generated using a convolutional neural network (CNN) model based on one or more promotional objects. In one embodiment, the BRTS identifies one or more key opinion leaders (KOLs) as originator nodes for the UGC using a convolutional neural network (CNN) model based on one or more promotional objects. In another embodiment, the one or more KOLs and corresponding promotional objects are recorded in a private interplanetary file system (IPFS) that interacts with the blockchain database.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

The social media platform provides members to build or join online communities, get information, interact with each other, and share information. With the exponential growth of the social network, social media influencers are thriving. A social media influencer, aka Key Opinion Leader (KOL), through his/her presence on the social media platform, has gained and established credibility in one or more specific industry taxonomies. As members of the social media network share information to the public or one or more online communities, a group of members build their reputation and gain trust for their knowledge and expertise in one or more industry taxonomies. These members grow their number of followers on the social media network and wield their influence through social media. The KOLs and their followers build an effective network for social media marketing like that of word-of-mouth. However, tracking and recording as the promotional materials propagate the social media network requires transparency, accuracy, and traceability. The blockchain-based tracking referral system (BRTS) provides efficiency, transparency, and traceability for social media commerce marketing.

Figure 1:
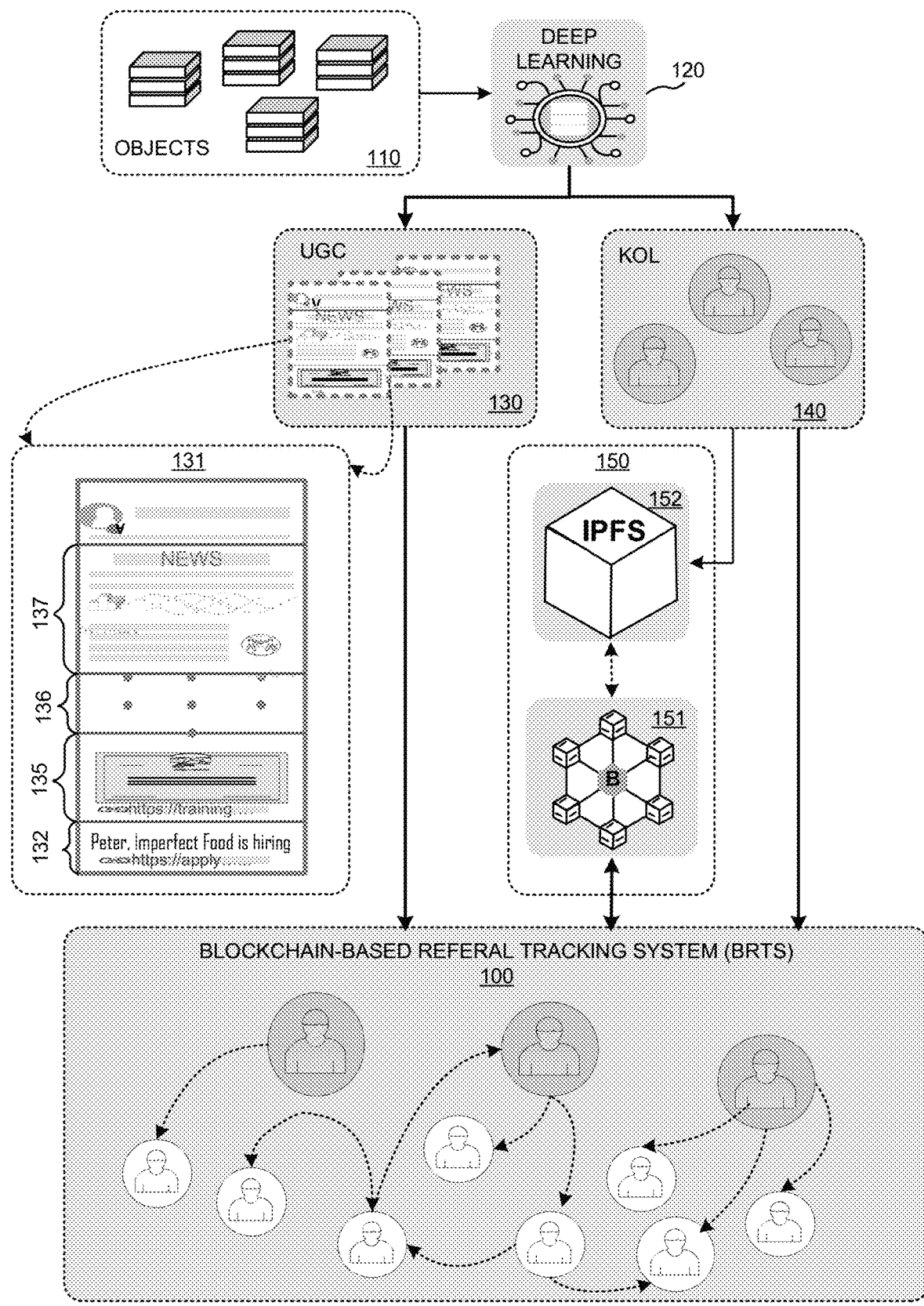
FIG. 1 illustrates exemplary diagrams for a blockchain-based referral tracking system (BRTS) in accordance with embodiments of the current invention.

FIG. 1 illustrates exemplary diagrams for a blockchain-based referral tracking system (BRTS) in accordance with embodiments of the current invention. A BRTS system 100 gets a set of user generated contents (UGC) 130. The set of UGCs are published through a group of KOL 140 and propagated in a social media network. UGC 130 are generated based on a set of promotional objects 110. In one embodiment, one or more UGCs are generated using a deep learning/data mining 120 on domain-specific big data. In one embodiment, KOL 140 are obtained using a deep learning/data mining 120 on domain-specific big data. Once the UGCs are published, each UGC with one or more promotional items propagates through the social media network. BRTS system 100 tracks UGC, updates corresponding records, and upon detecting exit conditions, adds the record to the database 150. In one embodiment, database 150 includes a blockchain database 151 and a private interplanetary file system (IPFS) 152.

In one embodiment, a group of KOL 140 is identified based on one or more promotional items, such as object 110. In one embodiment, a group of KOLs are identified using a deep learning convolutional neural network (CNN) model. A domain specific learning model, such as the CNN model, is developed based on each promotional item/object. Each identified KOL is associated with one or more promotional items. Each promotional item is associated with one or more KOLs.

In one embodiment, one or more UGCs 130 are generated for each promotional item. In recent years, it is proven that a KOL delivering an eWOM message to his/her followers is an effective way to push products and services. Many studies support the idea of using user generated content (UGC) as eWOM. Social posts, images and videos from real people are popular with user-generated content (UGC). The combination of KOL and UGC becomes a powerful marketing tool to promote products and services. The UGC for promotional purposes includes one or more actionable items associated with one or more promotional items. An exemplary UGC 131 is published by a KOL and pushed to the KOL's community of followers. For example, UGC 131 includes a personalized industry news 137, a first personalized new product or service announcement 135, and a second promotional product/service announcement 132. Other personalized contents 136 can also be included, such as personalized columns and articles that are known to draw interest in the KOL's community readers. In one embodiment, the personalized contents, such as those in 132, 135, 136 and 137 are generated based on one or more attributes of one or more promotional objects using a CNN deep learning model.

In one embodiment, BRTS 100 also includes a storage system 150. In one embodiment, storage system 150 is part of BRTS 100. In another embodiment, BRTS 100 includes interface modules to interact with storage system 150. Storage system 150 for BRTS includes two storage technologies, a blockchain distributed ledger 151 and a private Interplanetary file system (IPFS) 152. In one embodiment, information of KOL 140 is stored in IPFS 152. BRTS 100 updates UGC transaction records in blockchain database 151.

Figure 2:
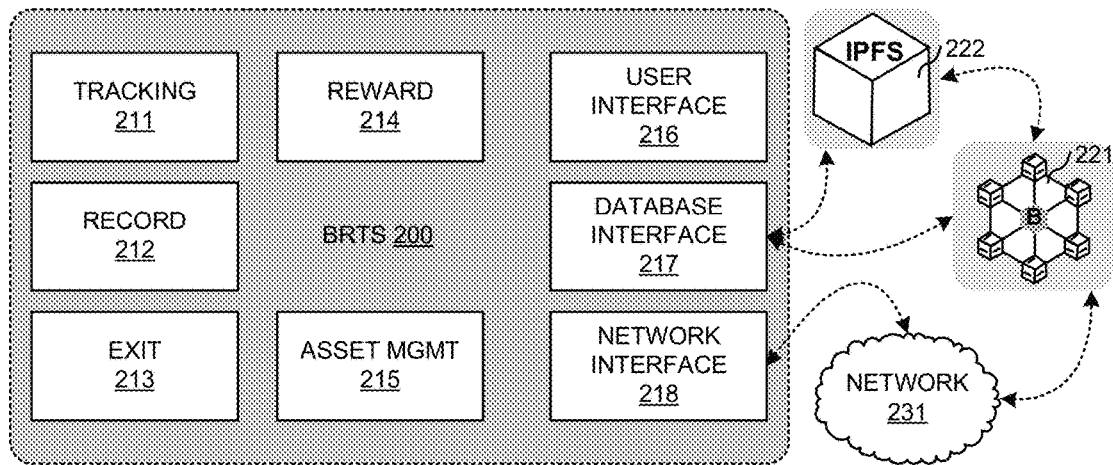
FIG. 2 illustrates an exemplary block diagram of functional modules of a blockchain-based referral tracking system in accordance with embodiments of the current invention.

FIG. 2 illustrates an exemplary block diagram of functional modules of a blockchain-based referral tracking system in accordance with embodiments of the current invention. BRTS 200 comprising a tracking module 211, a record module 212, an exit module 213, a database interface 217, and a network interface 218. In other embodiments, BRTS 200 further includes one or more modules comprising a reward module 214, an asset management module 215, and a user interface 216. In one embodiment, BRTS 200 also includes database modules, including a blockchain database 221, and a IPFS 222. Tracking module 211 tracks transactions of a user generated content (UGC), wherein the UGC propagates from an originator node through multiple receiving nodes in a social media network, and wherein the UGC comprises one or more actionable items. Record module 212 updates a UGC record upon detecting one or more predefined transactions at a receiving node, wherein the UGC record comprising at least a transaction history from the originator node to the receiving node. Exit module 213 detects one or more exit transactions at an ending node. Reward module 214 generates one or more referral rewards for each UGC tuple record based on a configured rewarding scheme. Asset management module 215 stores and retrieves one or more UGC tuple records from the blockchain database and the actual assets from the IPFS upon detecting one or more user requests. User interface module 216 takes input from user devices and sends outputs to one or more user devices. Database interface module 217 adds a UGC tuple of transactions from the originator node to the ending node based on the UGC record to a blockchain database upon detecting the one or more exit conditions. 217 also works with Asset Management 215 to store and retrieve assets from IPFS. The hash addresses of the assets are stored in blockchain 221. Network interface module 218 connects BRTS with a network 231. In one embodiment, network 231 is a social media network. In other embodiments, the BRTS modules and components run one or more processors or run on different network-connected devices and communicate with each other via predefined network messages. In other embodiments, the functions can be implemented in software, firmware, hardware, or any combinations.

In a social media commerce marketing referral eco system, traditionally, the only person who is rewarded monetarily is the KOL. In a social media network, the promotional items can propagate several layers of followers. To reward the followers efficiently encourages the participation of propagations of the marketing materials and benefits the KOL as the community of the KOL expands beyond the direct followers. With the popularity of sharing economy, BRTS offers people in the community an opportunity not only to share the funs of the UGC but also the wealth. By dismantling the one-way top-down word-of-mouth, a follower can be an advocate and evangelist and use her own network to further promote the products and services, and, at the same time, gets monetary reward. Moreover, she may have a chance to become a KOL and grow her network if she chooses to. It will be a win-win situation for the KOL and her followers.

Figure 3:
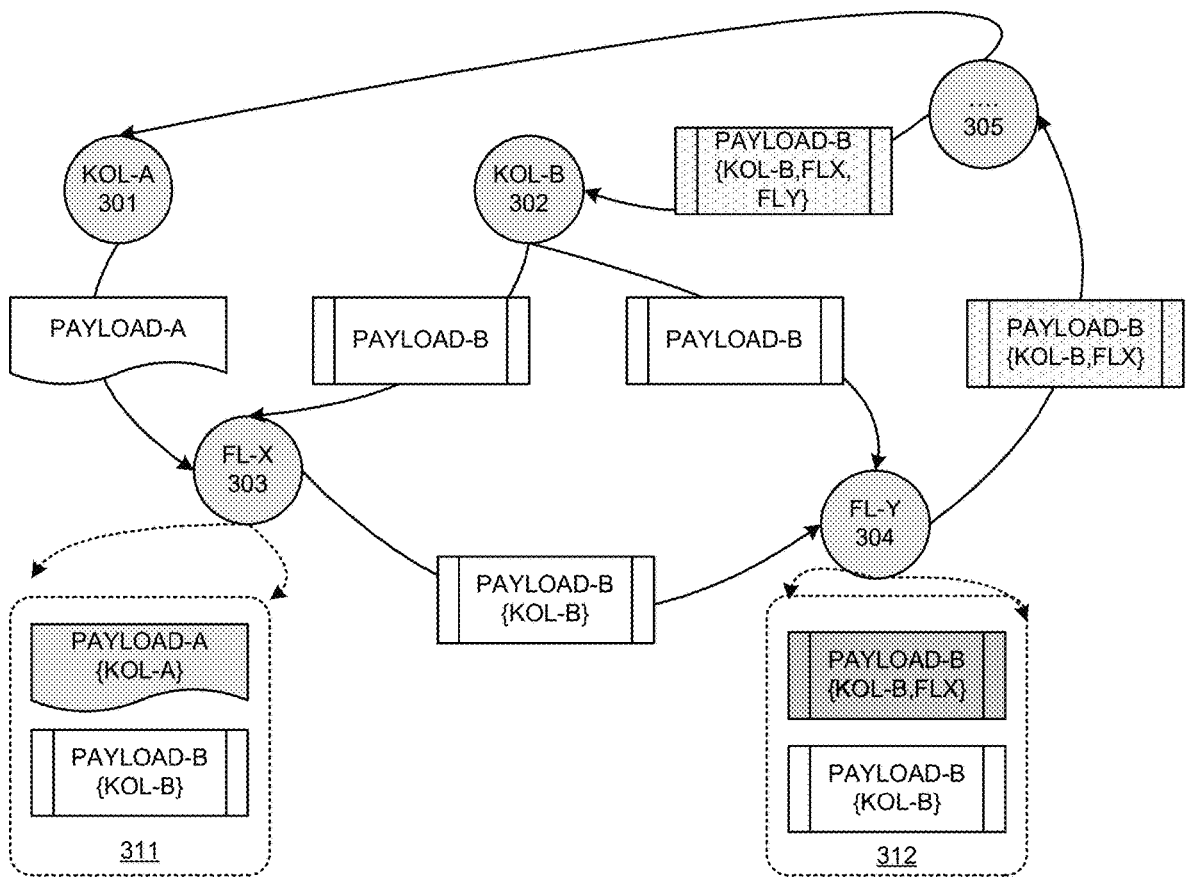
FIG. 3 illustrates exemplary diagrams of a referral tracking process using the blockchain-based referral tracking system in accordance with embodiments of the current invention.

FIG. 3 illustrates exemplary diagrams of a referral tracking process using the blockchain-based referral tracking system in accordance with embodiments of the current invention. An exemplary referral network includes a KOL-A 301, a KOL-B 302, a Follower-x 303, a Follower-Y 304, and exemplary other Followers 305. Follower-x 303 follows KOL-A 301 and KOL-B 302. Follower-Y follows KOL-B 302. KOL-A 301 is engaged in promoting a Payload_A. KOL-A 302 is engaged to promote a Payload_B. Both KOL-A 301 and KOL-B 302 are originator node in a chain of transactions of corresponding UGC. A payload is the UGC that has commercial values such as advertising, product and service promotion, etc. In one embodiment, an AI writing system, such as deep learning model, creates personalized content of Payload_A for KOL-A. Payload_A, a UGC, includes one or more actionable items for one or more promotional items. An actionable item in the UGC represents the contents of the UGC that the receiver/reader of the UGC can act upon to access or get to know the promotional items. Exemplary actions are clicking through a direct link to a sales page, opening an embedded program to a promotional page, accessing contact information for promotional items with referral information, buying the product, subscribing the service or any other and any combination of action that the user takes to access or get to know the promotional item. KOL-B 302 pushes the same payload, Payload_B, to indicate the payload is coming from KOL-B 302. Follower-X 303 happens to be follower of both KOL-A 301 and KOL-B 302. The UGCs from KOL-A 301 and KOL-B 302 may have different contents, but the actionable items in the payload are identical. In their social media groups, Follower-X 303 receives payloads from both KOL-A 301 and KOL-B 302, respectively. Follower-X 303 has a social media content 311 includes Payload-A from KOL-A and Payload-B from KOL-B. Follower-X 303 acts on one or more actionable items in the payload from KOL-A as depicted as a shaded object in 311. In one embodiment, a referral reward model is set up based on the UGC transactions following predefined criteria. In this example, KOL-A 301 qualifies for a reward based on Follower-X's acting on payload/UGC directly from KOL-A.

Follower-X 303 also forwards KOL-B's UGC with Payload_B to Follower-Y 304 through her own network. Follower_Y 304 receives two UGCs, one from Follower_X 303 and one from KOL-B 302. Follower_Y 304 acts on the Payload_B forwarded by Follower_X. Follower-Y has a social media content 312, including Payload-B from Follower-X forwarded from KOL-B, and Payload-B from KOL-B directly. In one embodiment, Follower-Y acts on one or more actionable items on the Payload-B from Follower-X forwarded from KOL-B as depicted as a shaded object in 312. Based on the transaction of the UGC in this transaction, both KOL-B 302 and Follower-X 303 qualify for a reward following predefined criteria. In one embodiment, the predefined criteria for reward are configured through a user interface and updated dynamically. In another embodiment, the predefined criteria for reward is generated and updated dynamically using a deep learning model.

The referral activity may be carried out continuously and asynchronously. In such cases, the propagation route of the referral could become cyclical. For example, Follower-Y 304 pushes Payload-B received from Follower-X forwarded by KOL-B to another Follower 305. Follower 305 pushes the received Payload-B received from Follower-Y forwarded Follower-X and KOL-B back to KOL-B 302. The Payload-B/UGC, in this example, comes back to the originator node KOL-B 302. In on embodiment, when the receiving node is the originator node of the UGC transaction, the tracking of the UGC terminates based on the exit condition being met.

In one embodiment, the UGC transactions, including the push to one or more follower nodes and act-on one or more actionable items, are recorded using a recursive push procedure with inputs of a pushing node, a recipient node, and a payload. In one embodiment, two main "transactions" in the referral tracking scheme, namely, push( ) and act_on( ) are implemented. push( ) is the referral action that one person refers the UGC to another person. Function act_on( ) is when a person enacts on the payload of the UGC, such as buying a product or subscribing a service, etc. Function push( ) is recursive as shown in the following equations:

$$\begin{cases} push(X, Y, P) = record\_path(X, Y, P), push(Y, Z, P) & \text{tail recursion} \\ push(X, Y, P) = record\_path(X, Y, P), act\_on(Y, P) & \text{exit} \\ push(X, Y, P) = \text{other exit conditions} & \text{exit} \end{cases}$$

Function push(X,Y,P) denotes sender X pushes payload P to recipient Y. Function act_on(Y, P) means recipient Y acts on payload P. The first clause is a tail recursion, meaning, X pushes P to Y but Y does not act on payload P, instead, Y pushes the payload to another person Z. The recursion has several fixed points that become the exit conditions. These exit conditions are the business rules (or business logic) on how the referral is being implemented. For example, the second clause is an exit condition of the recursion whereby when X pushes P to Y, Y acts on the payload P and completes the action. After Y acts on P, Y can also push P to another person, which will be another recursive clause. Further note, a person X can push P to many other people, even in a multiple recursion. However, as any multiple recursions can be reduced to a simple tail recursion, the scheme using the tail recursion is illustrated.

In one embodiment, exit conditions are configured for the tracking module. Upon detecting one or more exit conditions at an ending node, a UGC tuple of transactions from the originator node to the ending node based on the UGC record to a blockchain database upon detecting the one or more exit conditions. The exit conditions are configurable dynamically. In one embodiment, the exit conditions are configured through a user interface taking user updates. In one embodiment, the one or more exit conditions for the recursion are:

1. When the recipient acts on the payload and completes the action, i.e. no further pushing;
2. When the recipient receives the payload is the initiator/originator of the UGC, e.g. the propagation is circulated back to the initiator/originator.
3. When the recipient does not act on or forward to other people, i.e. the recipient is a sink.
4. When the recipient tries to act on the payload but either it has passed its expiry date, or the maximum number of act-on's has been reached. For example, the payload is limited to maximum five redemptions.

Figure 4:
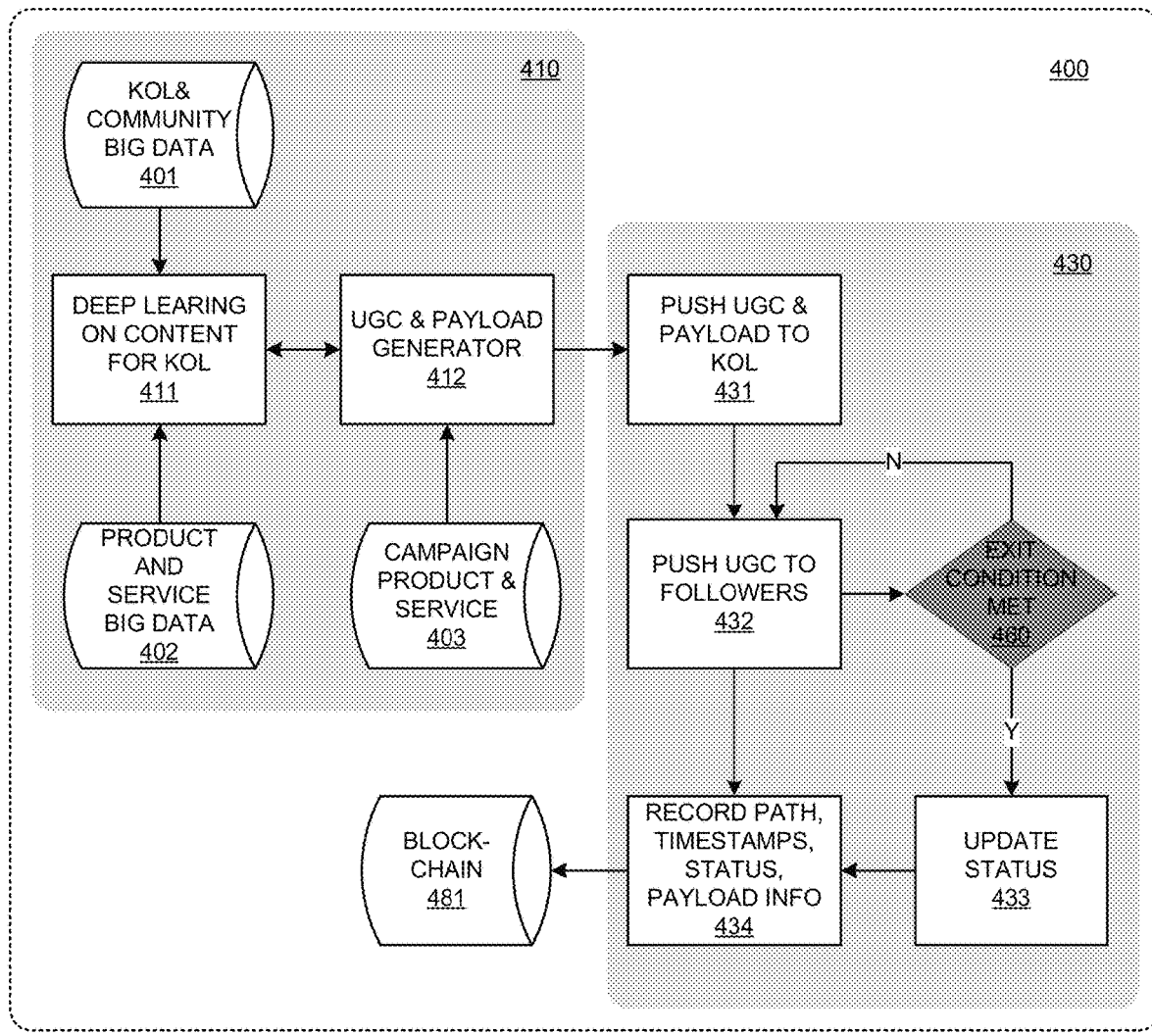
FIG. 4 illustrates exemplary flow diagrams of a referral tracking procedure in accordance with embodiments of the current invention.
Figure 4:
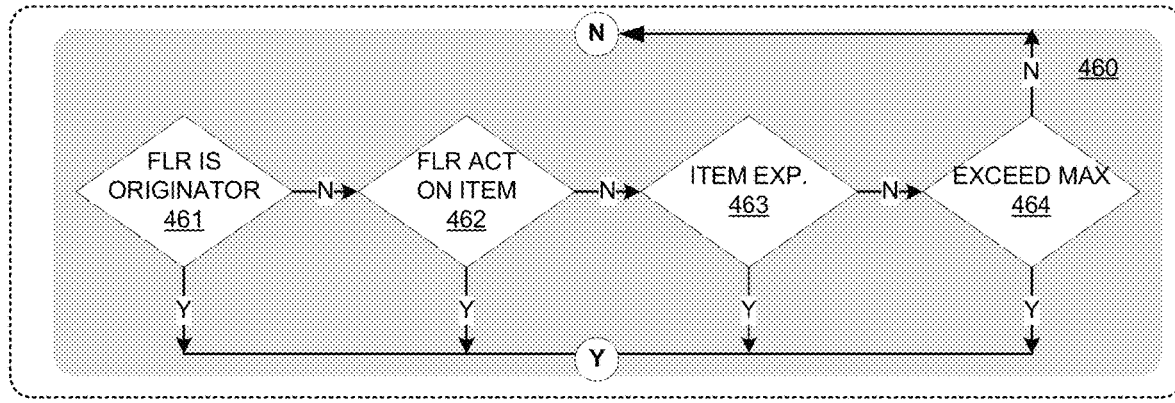

FIG. 4 illustrates exemplary flow diagrams of a referral tracking procedure in accordance with embodiments of the current invention. In one novel aspect, the transactions of a UGC is tracked when it propagates through the social network. The UGC record is updated upon detecting one or more predefined transactions. The UGC tuple of transactions from the originator node to the ending node is added to the database upon detecting one or more tracking exit conditions. A referral tracking procedure 400 includes a UGC generation sub-procedure 410 and a UGC tracking sub-procedure 430. UGC generation sub-procedure 410 includes a deep learning on contents for KOL 411, which is based on a KOL community Big Data 401 and a product and service Big Data 402, and a UGC and payload generator 412, which is based on the marketing campaign for certain products and services 403. UGC tracking sub-procedure 430 includes multiple procedures/process include process 431 of pushing UGC and payload to KOL, process 432 of pushing UGC to followers, process 460 of detecting and determining one or more exit conditions, process 433 of updating status, and process 434 of recording path, timestamps, status, and payload information.

Deep learning on contents for KOL 411 is a deep learning CNN model trained with Big Data on the KOLs and their communities 401 and the product and services 402 that are intended to promote. Deep learning on contents for KOL 411 locates the KOLs and communities that will have the best chance for which products and services. UGC Payload generator procedure 412 consults deep learning module on contents for KOL 411 to identify the KOLs, the communities, and the products and services for each of these KOLs. UGC Payload generator procedure 412 further generates the user-generated contents (UGCs) along with the payload with an AI-based writing system. The results of Process 412 are placed in the KOL's channel for promotion as shown in Process 431. Process 431 pushes the UGC to corresponding KOL followers. The push event will be processed by Process 434, which appends the transaction to Blockchain (240). The push transaction has the path, timestamp, status, and payload information. Process 431 pushes the UGC to the followers. For each follower who has access to the UGC, Process 432 determines if one or more exit conditions are met. If process 460 determines there exists at least one exit condition, the referral tracking for the UGC record is terminated. Process 433 updates the status. Process 434 will append a transaction to Blockchain 481. If process 460 determines there is no exit condition, the UGC record is updated as the UGC propagates further through the social network.

In one embodiment, the referral tracking process determines whether one or more exit conditions are met. Process 460 determines whether there exists any exit condition for the UGC recording. At step 461, the process 400 determines whether the follower/recipient of the UGC is the originator of the UGC. If step 461 determines yes, process 460 determines exit condition exists and exit. If step 461 determines no, it moves to step 461. Step 461 determines if the follower/recipient act on one or more actionable items in the UGC. If step 462 determines yes, process 460 determines the exit condition exists and exit. If step 462 determines no, it moves to step 463. Step 463 determines whether the actionable items has the action timer expired. If step 463 determines yes, process 460 determines the exit condition exists and exit. If step 463 determines no, it moves to step 464. Step 464 determines whether a maximum number of actions has reached for an actionable item. If step 464 determines yes, process 460 determines exit condition exists and exit. If step 464 determines no, process 460 determines no, which means there is no exit condition detected.

In one novel aspect, the blockchain is used to support traceability and transparency for the referral tracking system. Traceability and transparency foster trust among participants. A blockchain is essentially a distributed database of records or public ledger of all transactions or digital events that have been executed and shared among participating parties. Each transaction in the public ledger is verified by the consensus of a majority of the participants in the system. Further, once entered, information cannot be erased.

Figure 5:
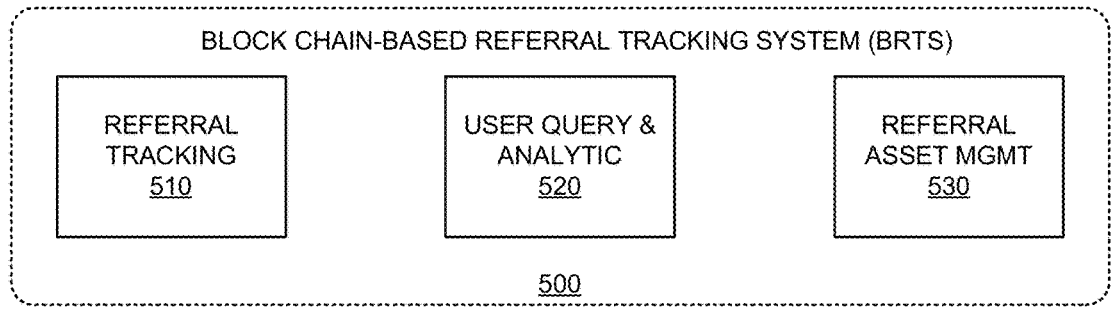
FIG. 5 illustrates an exemplary block diagram of the high-level architecture with blockchain database for the BRTS in accordance with embodiments of the current invention.

FIG. 5 illustrates an exemplary block diagram of the high-level architecture with blockchain database for the BRTS in accordance with embodiments of the current invention. The blockchain-based referral tracking system (BRTS) 500 includes a referral tracking module 510, a user query and analytic module 520, and a referral asset management module 530. Referral tracking module 510 is essentially the entire process described in FIG. 4, starting with the deep learning model to identify KOLs and communities, to generate personalized UGC for the KOLs, and to track the referrals. Module 520 is to support user query and analytic. Users such as KOLs and followers can trace the referral history and pedigree so they can build up the trust of the system. Management can also carry out analytics to assess the referral campaigns and to deter any fraud and anomaly. Module 530 Referral Asset Management is the module that maintains the assets of the entire system that includes, but not limited to, the KOL and follower profiles, the payload details, and so on.

There are basically two types of blockchain, namely, permissionless and permissioned blockchain. Public blockchains such as Bitcoin and Ethereum are permissionless and trustless blockchains. Their consensus algorithms require mining activities. Hence, they need crypto coins or tokens to pay for these mining activities. On the other hand, permissioned blockchains such as Hyperledger, Corda and Quorum do not require coin or token since there are no mining activities. Blockchain comprises two major technologies: the distributed ledger and smart contract. A distributed ledger is a multi-party fully distributed database with no central trusted authority. A hash-based data structure is essential to know that each entry in the ledger is in a certain order and is cryptographically connected to the prior entries. The exact order of those entries is transparent and verifiable by all participants, safeguarding the entries from manipulation or dispute. Therefore, a blockchain is transparent, immutable, and secure. Blockchain is increasingly applied to solve real-world problems because of the transparency, immutability, security, privacy, and disintermediation it provides. To achieve transparency, every transaction on the chain is broadcast to all other users in the network, who validate the transactions. Immutability arises because each block contains the hash of the previous block, preventing any changes to past transactions. Security is achieved through distributed architecture; the transaction history and data stored on the chain is distributed across many nodes in the network, so there is no single point of failure. The new referral tracking system can be implemented in either permissionless or permissioned blockchain, depending on the business model on how to market it and maintain it. To illustrate how a blockchain is used to support the proposed referral tracking system, we use a permissioned blockchain such as Hyperledger to illustrate the process.

Figure 6:
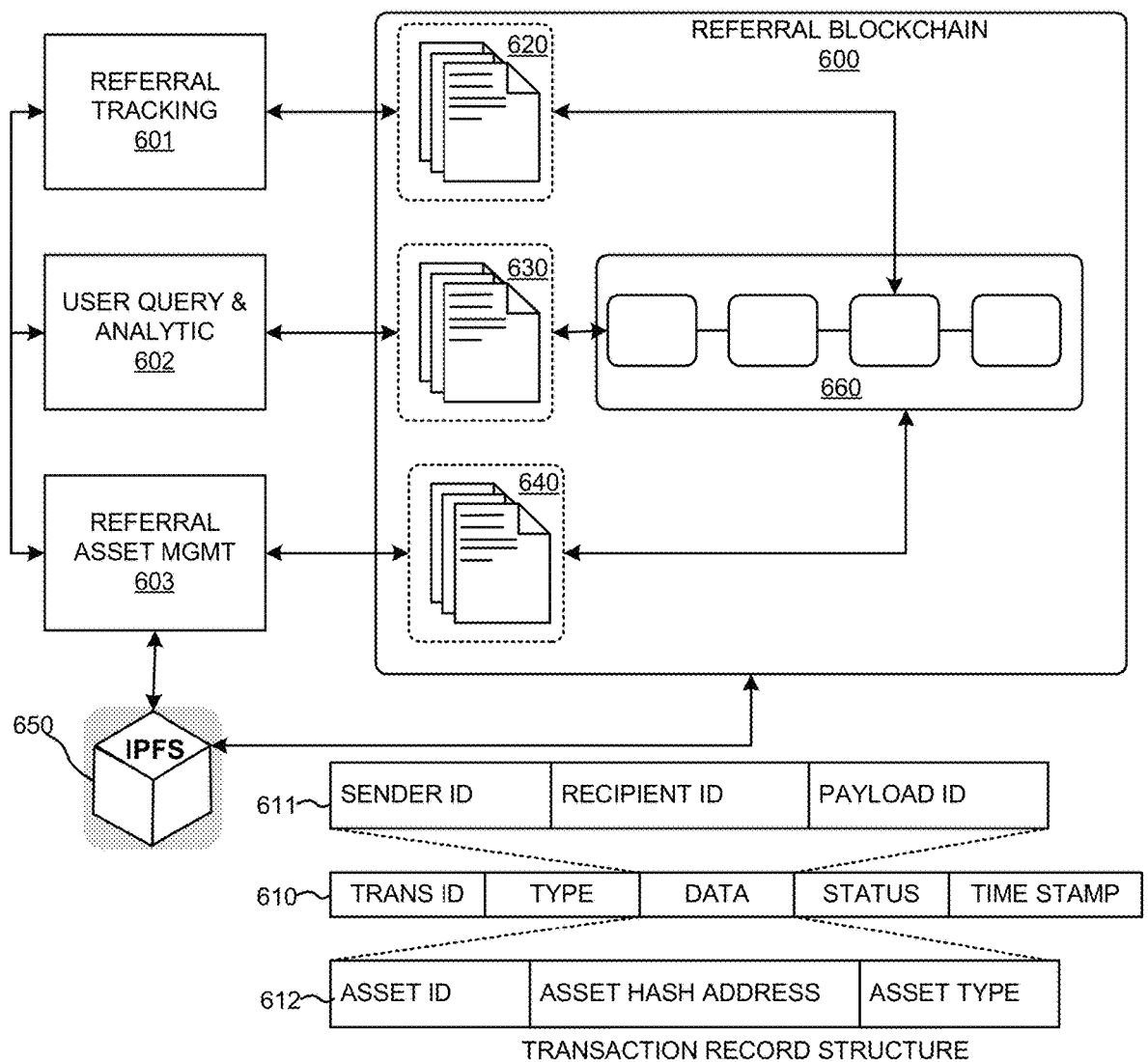
FIG. 6 illustrates exemplary diagrams of a storage system in the BRTS with blockchain distributed ledger and a private IPFS in accordance with embodiments of the current invention.

FIG. 6 illustrates exemplary diagrams of a storage system in the BRTS with blockchain distributed ledger and a private IPFS in accordance with embodiments of the current invention. BRTS uses a referral blockchain database 600 and a private IPFS 650. Transaction data on a blockchain holds simple scalar data. It is not practical for a blockchain to store, for instance, a picture or other BLOBs. To implement an efficient BRTS, Interplanetary File System (IPFS) is adopted. IPFS is a protocol and peer-to-peer network for storing and sharing data in a distributed file system. IPFS uses content-addressing to uniquely identify each file. It offers decentralization and tamper-proof storage with cryptography. In BRTS, the ledger is to maintain the referral history and pedigree of referrals. The blockchain transaction holds the hash addresses of the assets that are stored in IPFS. The bulk information of the participant and payload details are maintained in the IPFS.

The blockchain 600 contains a certain and verifiable record of every single transaction ever made. Smart contract is built upon the distributed ledger, such as distributed ledger 660. Since distributed ledger allows for multiparty and shared use, distributed ledgers can be equipped with multiparty business logic, which is more commonly referred to as 'smart contract'. These are programs written in a language particular to a given type of blockchain. The smart contracts live on the shared network and are able to execute on all participating nodes simultaneously.

The blockchain database 600 has the distributed ledger of the transaction record, as shown in the transaction record Structure 610 and three sets of smart contracts. Conceptually, BRTS could use two blockchains, one for the referral transactions, and a separate blockchain to index onto the assets managed by the IPFS. For instance, the profiles and other information pertinent to KOLs, followers and management staff are stored in the IPFS 650. Similarly, payload details are also stored in the IPFS 650. When an asset file is stored, IPFS 650 returns a unique hash address pointer of the file. IPFS 650 uses content-addressing to generate the hash-pointer address. These addresses become transactions and are stored in the blockchain. Any changes (e.g. update) yield different hash and the asset will be treated as a new one. Alternatively, we can use a single blockchain to record both referral transactions and asset indexing. The latter approach is adopted in the current design. 610 shows the header of a BRTS blockchain transaction, including the transaction ID, the type, the data field, the status, and the time stamp. The Type is either Referral or Asset. The data will be expanded depending on the type to either 611 or 612. If it is Asset type, the data field includes the Asset ID, the asset hash address, and the Asset Type (profiles, payload, etc.). The Asset ID is the "object ID" of the asset, such as the ID for the KOL, the follower or the payload. The Asset ID is created by referral asset management 603 and is unique throughout the BRTS. The asset hash address is essentially the hash address pointer of the asset managed by the IPFS. Any update of the asset will have a new hash address, but the unique asset ID remains unchanged. If it is Referral type, the record is expanded to include sender ID, recipient ID, Payload ID, status and timestamp whereby these IDs are simply the asset ID of the sender, recipient and payload files managed by 603 and IPFS. Status indicates the type of event such as forwarding, act-on and so on. Status in 611 and 612 can be further used as access control (ACL).

Referral Asset Management 603 manages storing and retrieving referral asset files and interfaces with the blockchain. User query and Analytic 602 allows users such as the KOLs, followers and other authorized personnel to interrogate and trace the referral activities. Three modules of smart contract, i.e., 620, 630, and 640 facilitate the modules Referral Tracking 601, User Query & Analytic 602, and Referral Asset Management 603, respectively.

Figure 7:
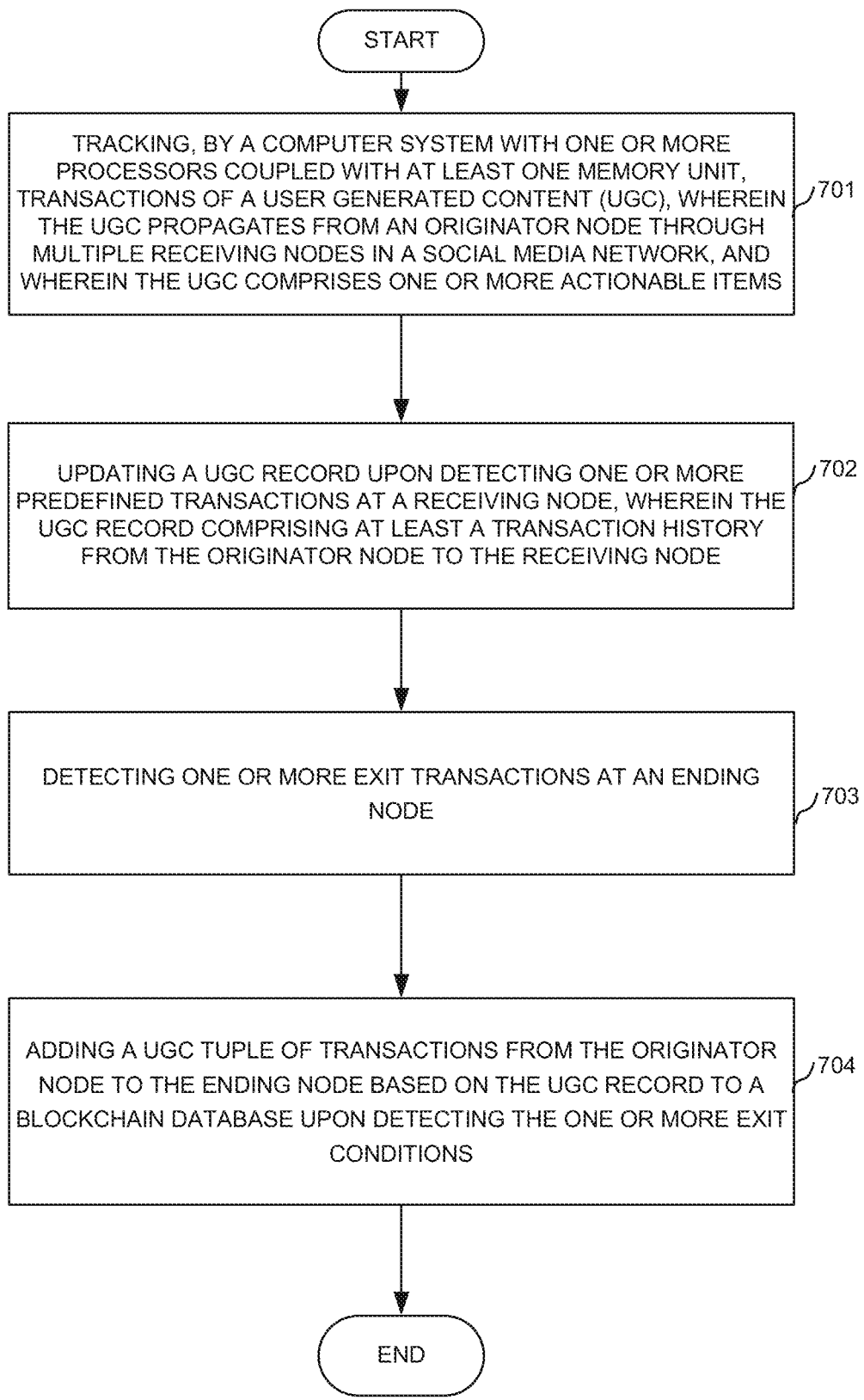
FIG. 7 illustrates an exemplary flow chart for the blockchain-based referral tracking system in accordance with embodiments of the current invention.

FIG. 7 illustrates an exemplary flow chart for the blockchain-based referral tracking system in accordance with embodiments of the current invention. At step 701, the BRTS tracks transactions of a user generated content (UGC), wherein the UGC propagates from an originator node through multiple receiving nodes in a social media network, and wherein the UGC comprises one or more actionable items. At step 702, the BRTS updates a UGC record upon detecting one or more predefined transactions at a receiving node, wherein the UGC record comprising at least a transaction history from the originator node to the receiving node. At step 703, the BRTS detects one or more exit transactions at an ending node. At step 704, the BRTS adds a UGC tuple of transactions from the originator node to the ending node based on the UGC record to a blockchain database upon detecting the one or more exit conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
tracking, by a computer system with one or more processors coupled with at least one memory unit, transactions of a user generated content (UGC), wherein the UGC propagates dynamically from an originator node through multiple receiving nodes forming one or more recursive propagation paths in a social media network, and wherein the UGC comprises one or more actionable items, and wherein each propagation path has a plurality of nodes including the originator node;
updating a UGC record upon detecting one or more predefined transactions at a receiving node, wherein the UGC record comprising one or more transaction history links along corresponding one or more recursive propagation paths from the originator node to the receiving node;
detecting one or more exit transactions at one ending node to terminate the recursion; and
adding a UGC tuple of transactions from the originator node to the ending node based on the UGC record to a blockchain database upon detecting the one or more exit conditions of the recursion.

2. The method of claim 1, wherein the one or more predefined transactions comprise pushing the UGC to one or more receiving nodes, acting on the one or more actionable items, and an expiration of a no-action timer.

3. The method of claim 1, wherein the one or more exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node.

4. The method of claim 1, wherein each transaction in the UGC record is associated with a timestamp indicating a time of the transaction.

5. The method of claim 1, wherein the UGC record is updated using a recursive push procedure with inputs of a pushing node, a recipient node, and a payload.

6. The method of claim 1, further comprising: generating one or more referral rewards for each UGC tuple record based on a configured rewarding scheme.

7. The method of claim 6, wherein the configured reward scheme is generated and updated through a user interface by user inputs.

8. The method of claim 1, further comprising: retrieving one or more UGC tuple records from the blockchain database upon detecting one or more user requests.

9. The method of claim 1, wherein the UGC is generated using a convolutional neural network (CNN) model based on one or more promotional objects.

10. The method of claim 1, further comprising: identifying one or more key opinion leaders (KOLs) as originator nodes for the UGC using a convolutional neural network (CNN) model based on one or more promotional objects.

11. The method of claim 10, wherein the one or more KOLs and corresponding promotional objects are recorded in a private interplanetary file system (IPFS) that interacts with the blockchain database.

12. A system comprising:
one or more networking interfaces that connects the system with a social media network;
a memory; and
one or more processors coupled to one or more memory units, the one or more processors configured to
track transactions of a user generated content (UGC), wherein the UGC propagates dynamically from an originator node through multiple receiving nodes forming one or more recursive propagation paths in a social media network, and wherein the UGC comprises one or more actionable items, and wherein each propagation path has a plurality of nodes including the originator node;
update a UGC record upon detecting one or more predefined transactions at a receiving node, wherein the UGC record comprising at least a transaction history along one propagation path from the originator node to the receiving node;
detect one or more exit transactions at one ending node; and
add a UGC tuple of transactions from the originator node to the ending node based on the UGC record to a blockchain database upon detecting the one or more exit conditions.

13. The system of claim 12, wherein the one or more predefined transactions comprise pushing the UGC to one or more receiving nodes, acting on the one or more actionable items, and an expiration of a no-action timer.

14. The system of claim 12, wherein the one or more exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node.

15. The system of claim 12, wherein each transaction in the UGC record is associated with a timestamp indicating a time of the transaction.

16. The system of claim 12, wherein the UGC record is updated using a recursive push procedure with inputs of a pushing node, a recipient node, and a payload.

17. The system of claim 12, further comprising a reward module that generates one or more referral rewards for each UGC tuple record based on a configured rewarding scheme.

18. The system of claim 12, further comprising an asset management module that retrieves one or more UGC tuple records from the blockchain database upon detecting one or more user requests.

19. The system of claim 18, wherein the asset management module further identifies one or more key opinion leaders (KOLs) as originator nodes for the UGC using a convolutional neural network (CNN) model based on one or more promotional objects.

20. The method of claim 19, wherein the one or more KOLs and corresponding promotional objects are recorded in a private interplanetary file system (IPFS) that interacts with the blockchain database.

* * * * *